B. FORD.
AUTOMATIC FILLER AND VENT FOR STORAGE BATTERIES.
APPLICATION FILED DEC. 19, 1912.

1,163,992.

Patented Dec. 14, 1915.
2 SHEETS—SHEET 1.

WITNESSES:

INVENTOR
Bruce Ford
BY
ATTORNEY.

B. FORD.
AUTOMATIC FILLER AND VENT FOR STORAGE BATTERIES.
APPLICATION FILED DEC. 19, 1912.
1,163,992.
Patented Dec. 14, 1915.
2 SHEETS—SHEET 2.
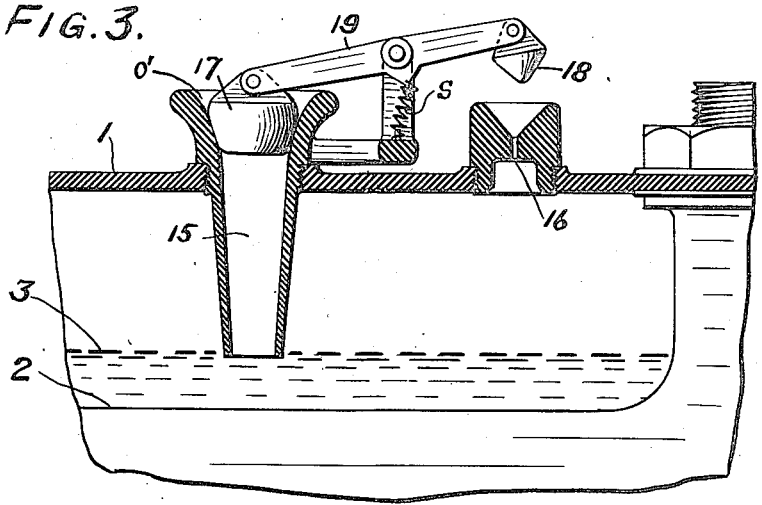
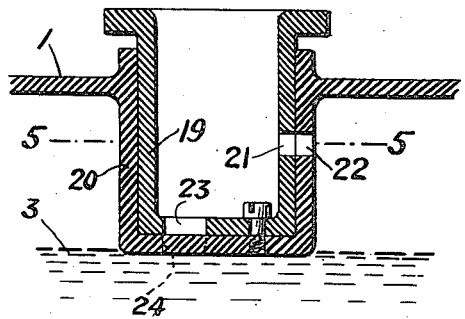
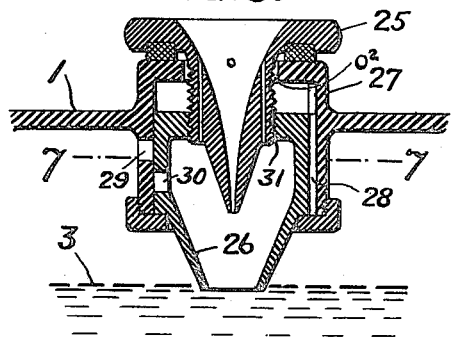
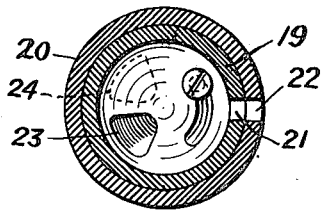
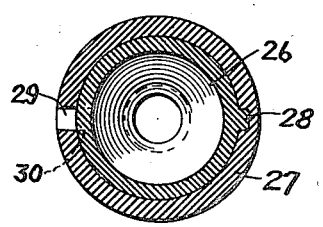
WITNESSES:
INVENTOR
Bruce Ford
BY
ATTORNEY

UNITED STATES PATENT OFFICE.

BRUCE FORD, OF PHILADELPHIA, PENNSYLVANIA.

AUTOMATIC FILLER AND VENT FOR STORAGE BATTERIES.

1,163,992. Specification of Letters Patent. Patented Dec. 14, 1915.

Application filed December 19, 1912. Serial No. 737,635.

*To all whom it may concern:*

Be it known that I, BRUCE FORD, a citizen of the United States, residing at Philadelphia, in the county of Philadelphia and State of Pennsylvania, have invented a certain new and useful Automatic Filler and Vent for Storage Batteries, of which the following is a specification.

Storage batteries are so proportioned and designed that in order to obtain the best results it is desirable that the fluid level in them shall not be raised above a predetermined height. However, in adding water to the battery it frequently happens that the fluid level is raised too high and in that case and in the use of the battery, acid or acidulated or alkaline fluid frequently finds its way out of the jar or container and causes inconveniences and sometimes damage.

It is the object of the present invention to provide the battery jar or container with a filler which automatically prevents the introduction of more water or liquid into the jar or container than will raise the level beyond the predetermined and desired level.

The invention will be claimed at the end hereof, but will be first described in connection with the embodiments of it, chosen from other embodiments, for illustration in the accompanying drawings, in which—

Figure 1:
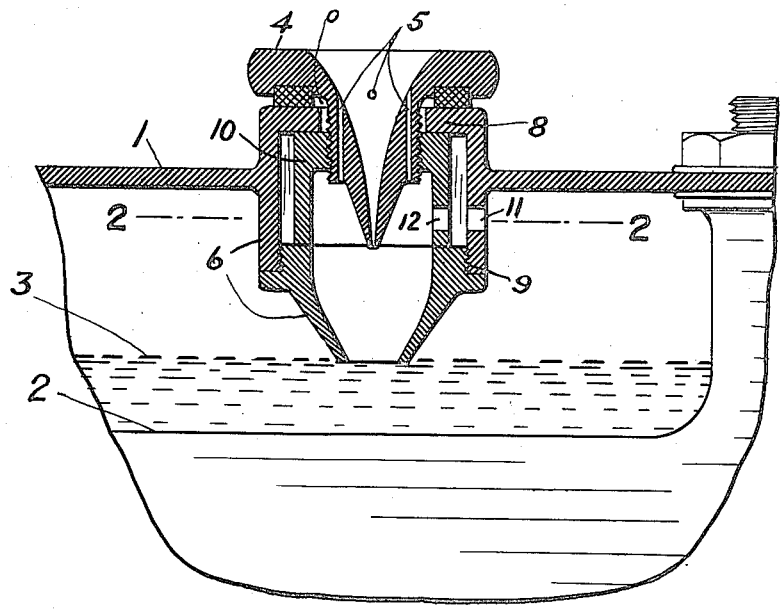
Figure 2:
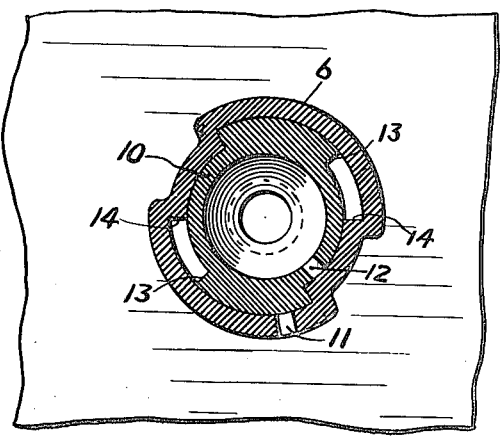

Figure 1, is a sectional view illustrating a filler embodying features of the invention and also parts of a battery. Fig. 2 is a section on the line 2—2 of Fig. 1. Fig. 3, is a sectional view illustrating a modification. Fig. 4, is a sectional view illustrating another modification. Fig. 5, is a section on the line 5—5 of Fig. 4. Fig. 6, is a view showing another modification, and Fig. 7, is a sectional view taken on the line 7—7 of Fig. 6.

In the drawings 1 represents a part of the cover of a storage battery, 2 represents a part of the plates or elements and 3 represents the electrolyte and in each case it is shown as at approximately the desired high level.

Referring to Figs. 1 and 2, 4 is the ordinary screw-plug which is provided with vents 5 and which serves to close the filling opening *o* against the passage of liquid but permits of the proper escape of gas. 6, is a sleeve fixed in respect to the cover and provided with a flange 8. The sleeve is shown as made in two parts, screwed together as at 9. Within the sleeve 6 and between flanges thereon is mounted a revoluble sleeve 10, threaded for the reception of the screw-plug 4. The fixed and revoluble sleeves are provided with openings 11 and 12 which may be in communication and which may not be in communication, according to the relative positions of the sleeves. The range of motion of the sleeves in respect to each other is limited by stops 13 and 14, shown in Fig. 2. 11, is the vent opening. When it is desired to introduce water into the jar, so as to raise the level therein to the required height the plug 4 is unscrewed and the frictional engagement of the threaded connection between it and the movable sleeve 10 turns the latter so as to bring the openings 12 and 11 out of alinement or out of communication; thus closing the vent opening 11. In these circumstances water or fluid may be introduced through the sleeve 10 until the level rises and seals off the sleeve 6. No more fluid can be introduced, because there is no way for the air or gas above the fluid level to escape. In consequence of this it is impossible to raise the level of the fluid higher than it is intended. The screw-plug is then returned to place and the frictional engagement of the threaded connection between the plug and sleeve 10 causes the latter to be rotated, thus bringing the openings 11 and 12 into communication and establishing communication between the interior of the jar and the interior of the sleeve for the escape of gas in the operation of the battery. Otherwise stated, the vent opening 11, is open and the filling opening *o*, is closed by the screw plug 4.

In Fig. 3, the filling opening *o'*, of the sleeve 15 and the vent opening 16 are controlled respectively by valves 17 and 18, of which one is shut when the other is open. For this purpose they are shown as mounted upon the opposite ends of a centrally pivoted lever 19 upon which a spring S acts. In this modification when the valve 17 is opened for filling, the valve 18 is closed, hence the level of the fluid as it rises seals off the bottom of the sleeve 15. When the level has risen to the proper height the operator closes the valve 17 and of necessity opens the valve 18 which establishes the appropriate vent for the battery when in use.

In the modification shown in Figs. 4 and 5, the cup-like vessels 19 and 20 are rotatable the one in respect to the other and are provided with mate openings 21 and 22, and 23 and 24, of which only two may be in communication at the same time. When the openings 23 and 24 are in communication the openings 21 and 22 are not in communication so that the jar can be filled only to a level that seals off the filling opening 24. When the rotatable member 19 is turned the openings 23 and 24 are not in communication and the openings 21 and 22 are in communication thus opening the vent 22.

In the modification shown in Figs. 6 and 7, the screw-plug 25 has screw and thread connection with the sleeve 26 which is free to rise and fall or have endwise movement in the fixed sleeve 27, being held against rotation by the feather and groove 28. The openings 29 and 30 may be in or out of communication. When the plug 25 is unscrewed for filling the opening $o^2$, is open and the sleeve 26 is in the position shown in Fig. 6 and there is no communication through the openings 29 and 30, the rising level of the fluid in the jar seals off the sleeve 26 at the proper level since the vent opening 29, is closed. When the screw-plug 25 is screwed in, it lifts the sleeve 26 by the screw and thread connections 31, thus bringing the openings 29 and 30 into alinement thus opening the vent 29.

What I claim is:

1. A filler for storage batteries comprising the combination of a jar having filling and vent openings of which one is provided with a depending wall operating as a liquid seal, valve mechanism including stopper provisions for each opening, and positive acting means whereby the filling stopper provisions open and close the vent stopper provisions when the filling stopper provisions are closed and opened.

2. A filler for storage batteries comprising the combination of a jar cover, fixed and movable sleeves opening through the cover and provided with filling and vent openings, of which the vent opening is closed when the filling opening is opened, substantially as described.

3. A filler for storage batteries comprising the combination of a cover wall, fixed and movable sleeves extending through the cover and of which one operates as a seal, vent openings through the sleeves, and a plug supported by one sleeve and having screw and thread engagement with the other sleeve and adapted to shift the movable sleeve to establish and disestablish communication through said openings.

4. A filler for storage batteries comprising the combination of a jar cover, a fixed sleeve extending through the cover and constituting a seal and provided with flanges and with a vent opening, a revoluble sleeve carried by said flanges and provided with a vent opening, a vent plug supported by the fixed sleeve and having thread and screw connection with the revoluble sleeve, and stops for limiting the turning movement of the revoluble sleeve, substantially as described.

5. A storage battery jar having a filling opening provided with a depending wall which operates as a liquid seal and which has formed through it a vent opening, and means for positively closing and opening the vent opening by the opening and closing of the filling opening.

6. A filler for storage batteries comprising the combination of a jar cover having a vent opening and a filling opening, a depending sealing element, and means all of which is disposed above the lower end of the depending seal element and above the liquid level for closing the vent opening to permit the seal element to coöperate with the filling opening to limit the level of the electrolyte in the jar and for closing the filling opening to permit the vent opening to operate as a vent.

7. In a storage battery, a cover having a chambered wall provided with a vent opening, a vent plug adapted to be fitted to said chambered wall, and means automatically sealing said opening when the vent plug is removed, and uncovering or unsealing said opening when the vent plug is in normal position.

8. In a storage battery, a cover having a chamber provided in its wall with a vent opening, a vent plug removably fitted to the chamber, and means in the chamber for sealing said opening when the plug is removed.

9. In a storage battery, a cover having a chamber provided with an opening in the wall thereof, a vent plug removably fitted in the opening, means in said chamber covering the opening and adapted to be shifted by the vent plug so as to uncover said opening when the vent plug is placed in position.

10. A storage battery jar having a filling opening provided with a depending wall which operates as a liquid seal and which has formed through it a vent opening, and means for closing and opening the vent opening by the opening and closing of the filling opening.

11. In a storage battery the combination of a jar having a cover provided with a vent and filling opening having a depending wall provided with a vent opening inside of the cover, a closure for the opening, and a second venting means outside of the cover.

In testimony whereof I have hereunto signed my name.

BRUCE FORD.

Witnesses:
CLIFFORD K. CASSEL,
FRANK E. FRENCH.